UNITED STATES PATENT OFFICE.

NATHANIEL B. POWTER, OF NEW YORK, N. Y., ASSIGNOR TO JOHN ORRETT, OF KINGSTON, JAMAICA, WEST INDIES.

PHOSPHATIC FERTILIZER.

SPECIFICATION forming part of Letters Patent No. 407,241, dated July 16, 1889.

Application filed August 20, 1888. Serial No. 283,280. (Specimens.)

*To all whom it may concern:*

Be it known that I, NATHANIEL B. POWTER, a citizen of the United States, residing in the city, county, and State of New York, have invented certain new and useful Improvements in Fertilizing Compositions, fully described and represented in the following specification.

The composition described herein is intended to utilize a particular class of phosphate rock which is obtained at the Cayman Islands, in the West Indies, and which contains a considerable amount of alumina in combination with phosphates, and is so constituted as not to be adapted for application to fertilizing purposes by the same means or processes as ordinary phosphate rock free from alumina.

My composition also furnishes a means of utilizing the nitrogenous matter in waste animal products with the phosphates and other ingredients of the rock to form a useful fertilizer.

The composition consists in eight hundred pounds of the phosphatic guano or rock from the Cayman Islands, six hundred pounds of animal matter combined with not more than the same amount of water, five hundred and fifty pounds of 60° Baumé sulphuric acid, and fifty pounds carbonate of lime. If the animal matter be used in any semi-solid form (as skin or hair) such animal matter would be combined with considerable water, and if it were used in a dissolved form (as the water from rendering-tanks) it would contain a still larger amount of water; but the weight I have given for the animal matter in my composition (six hundred pounds) is the weight that the animal matter would have when dried, independent of the water with which it may be combined, and the water combined with such animal matter should not, for the purposes of my invention, exceed more than six hundred pounds in weight.

The ingredients I have described, when thoroughly mixed together, form a dry granular composition, as the reaction of the rock or the guano and the carbonate of lime with the sulphuric acid causes the absorption of all the water that may be mingled with the animal matter, provided such water does not exceed six hundred pounds in weight.

The fertilizer produced by this composition is rich in all the most desirable elements, is easily prepared and transported, and utilizes a class of phosphate rock containing a large proportion of alumina which it has heretofore been difficult to convert cheaply into a dry granular fertilizer.

It is obvious that a slight departure may be made from the exact weights that I have given for the several ingredients of my composition without materially affecting the value or utility of the resulting composition; but experience and practice have taught me that the above-named proportions are valuable, and what I desire to secure is a composition containing such ingredients in substantially the proportions named.

It is scarcely necessary to say that if a weaker acid were used (as 50° Baumé) a little larger amount would be required, and that if a stronger acid were used (as 66° Baumé) a smaller amount would be required; but any chemist would be capable of making the necessary allowance in such case, the amount of acid that was used being in any case a chemical equivalent of five hundred pounds of 60° acid, as specified herein.

What I claim as my invention is—

The dry fertilizing composition herein described, composed of phosphatic guano or rock from the Cayman Islands, water containing about fifty per cent. of animal matter in excess of sulphuric acid, and sulphate of lime, combined substantially in the proportions set forth.

In testimony whereof I have hereunto set my hand in the presence of two subscribing witnesses.

NATHANIEL B. POWTER.

Witnesses:
 THOS. S. CRANE,
 L. LEE.